United States Patent [19]

Neely, Jr.

[11] 3,926,319

[45] Dec. 16, 1975

[54] BALE HANDLING APPARATUS

[76] Inventor: Allan B. Neely, Jr., 12991 E. Nevada, Aurora, Colo. 80010

[22] Filed: June 17, 1974

[21] Appl. No.: 479,827

Related U.S. Application Data

[63] Continuation-in-part of Ser. No. 335,547, Feb. 26, 1973, Pat. No. 3,817,405.

[52] U.S. Cl. ............... 214/6 B; 198/154; 198/158; 214/6 BA; 214/6 F
[51] Int. Cl.² ................... A01D 87/12; B65G 57/32
[58] Field of Search ....... 214/6 B, 6 BA, 6 F, 8.5 A; 198/7 BL, 154, 155, 156, 157, 158

[56] References Cited
UNITED STATES PATENTS

| | | | |
|---|---|---|---|
| 964,099 | 7/1910 | Gardner | 198/157 X |
| 1,022,681 | 4/1912 | Johnston | 198/157 |
| 1,302,631 | 5/1919 | Buck | 198/154 X |
| 1,935,409 | 11/1933 | Mudd | 214/6 F X |
| 2,066,866 | 1/1937 | White | 198/154 |
| 3,278,050 | 10/1966 | Tarbox | 214/6 B |
| 3,549,023 | 12/1970 | Backman | 214/6 B |
| 3,631,992 | 1/1972 | Dickinson | 214/8.5 A |
| 3,809,256 | 5/1974 | Miskin | 214/6 B |
| 3,817,405 | 6/1974 | Neely, Jr. | 214/6 B |

Primary Examiner—Robert J. Spar
Assistant Examiner—L. J. Paperner
Attorney, Agent, or Firm—Van Valkenburgh, Lowe & Law

[57] ABSTRACT

An apparatus to load and unload hay bales onto and from a deck section of a vehicle. The bales are arranged on the deck as a horizontally disposed stack having layers of bales arranged in vertical tiers which shift along the deck of the vehicle as the stack is formed or depleted. The apparatus includes a loading and unloading elevator, preferably at the front of the vehicle, which will pick up or receive bales. In sequence, the elevator will then move the bales into position to form a tier layer, move the layer upwardly to permit other bales to move into position until a tier is completed. Thereafter, the tier is pushed onto the deck. When the stack on the deck is completed and is to be unloaded, a reverse operation is effected. A tier is shifted from the deck and onto the elevator. The bales are then dropped layer by layer onto a conveyor below the elevator to discharge one bale at a time from the vehicle.

10 Claims, 8 Drawing Figures

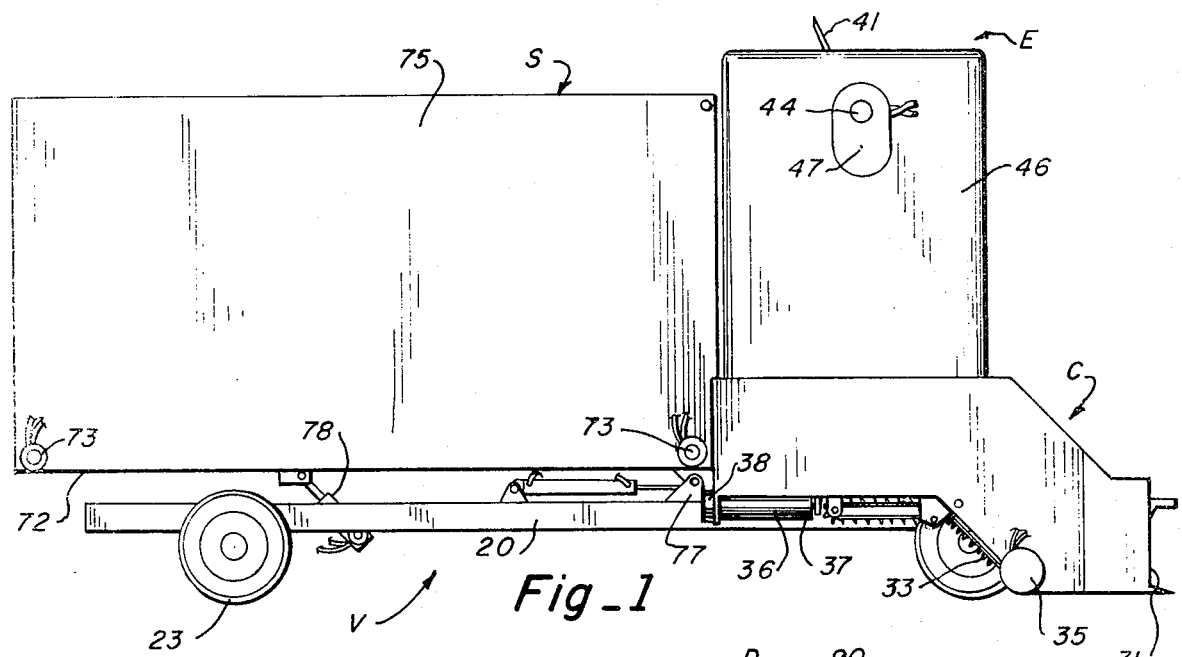
Fig_1
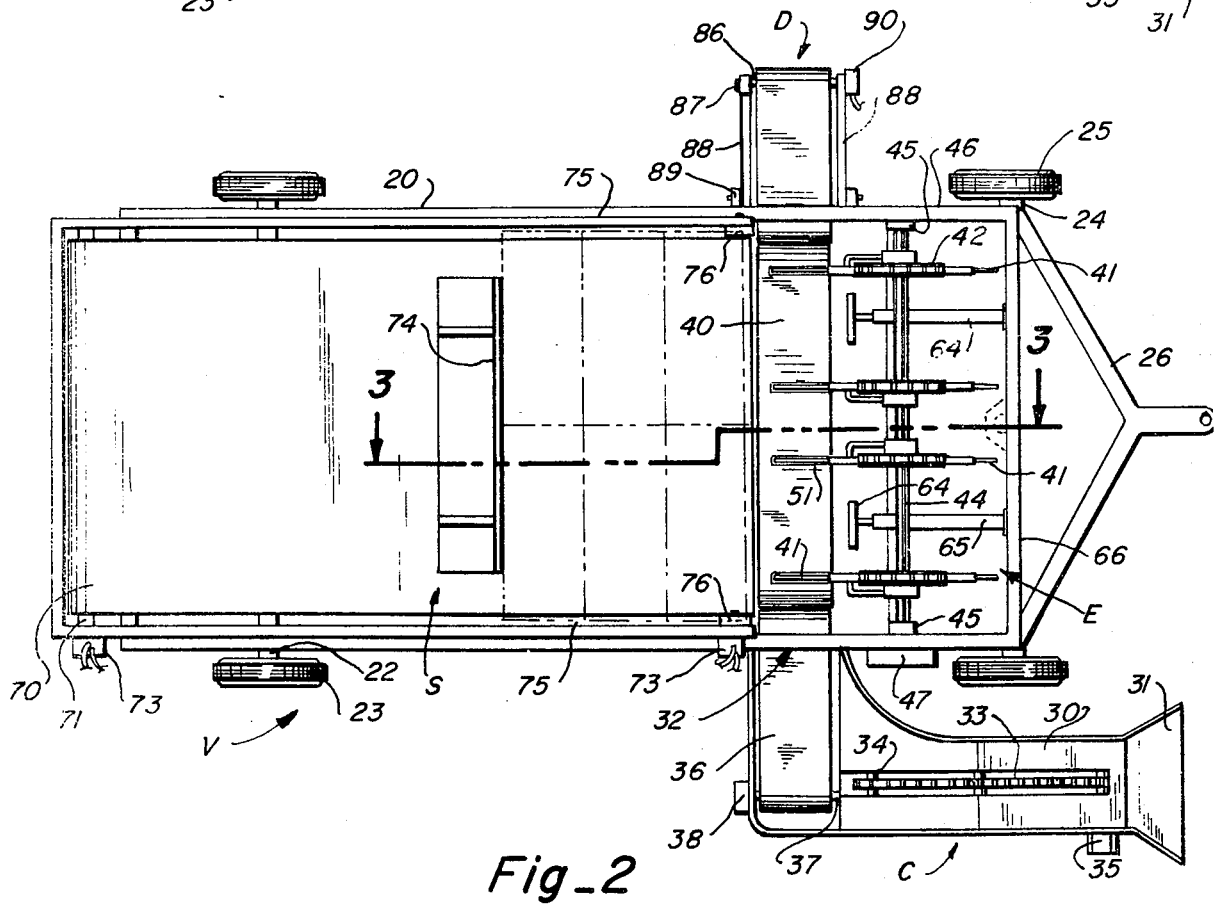
Fig_2

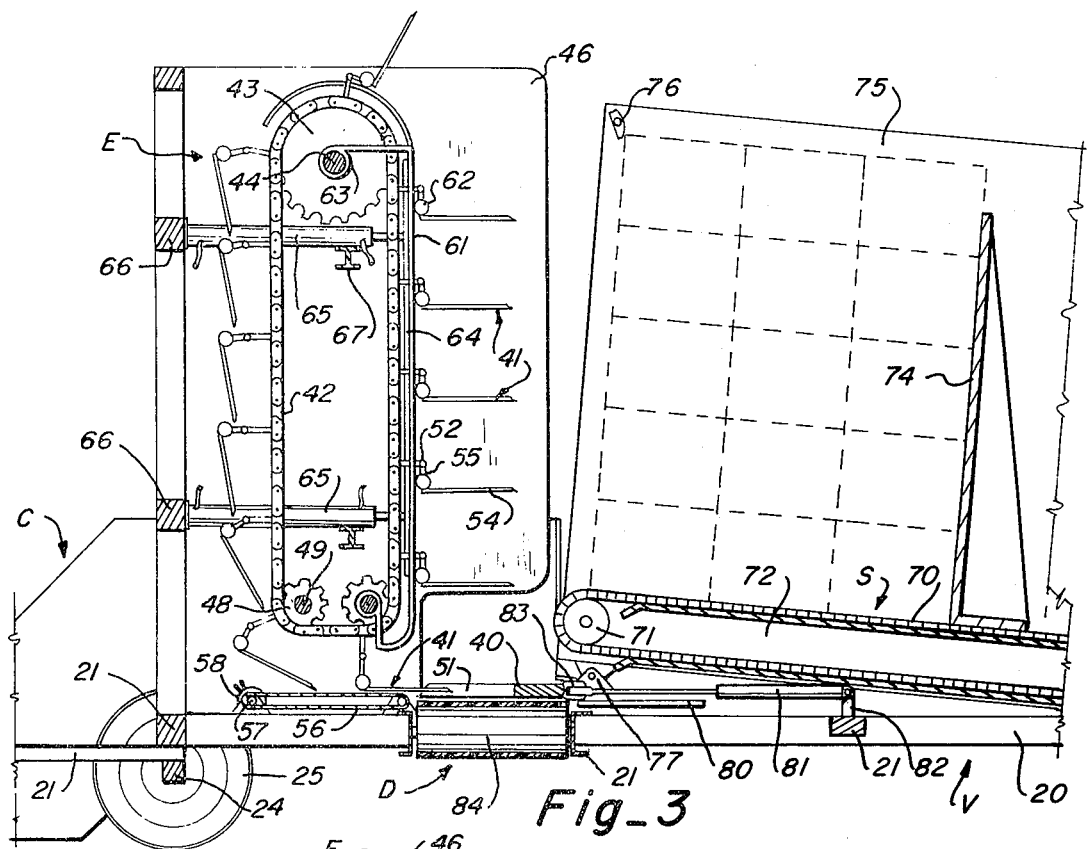
Fig_3
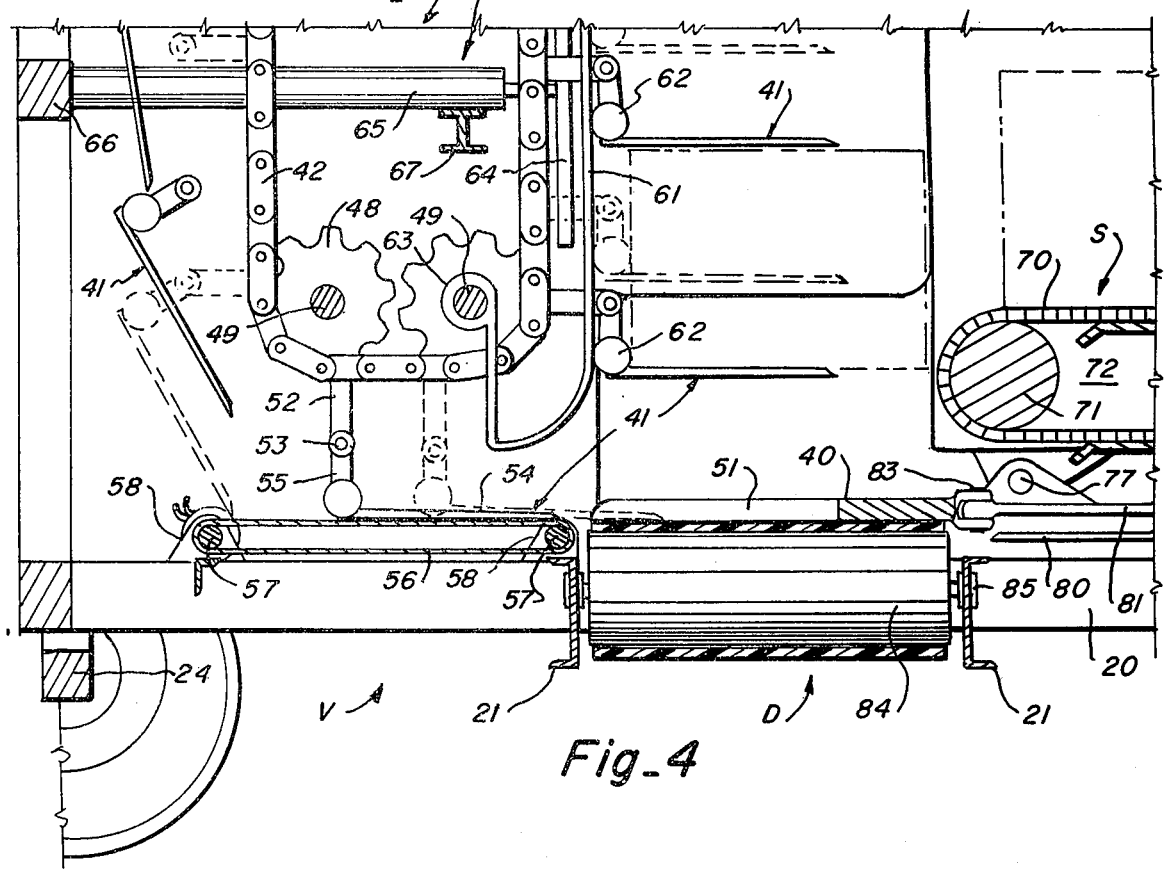
Fig_4

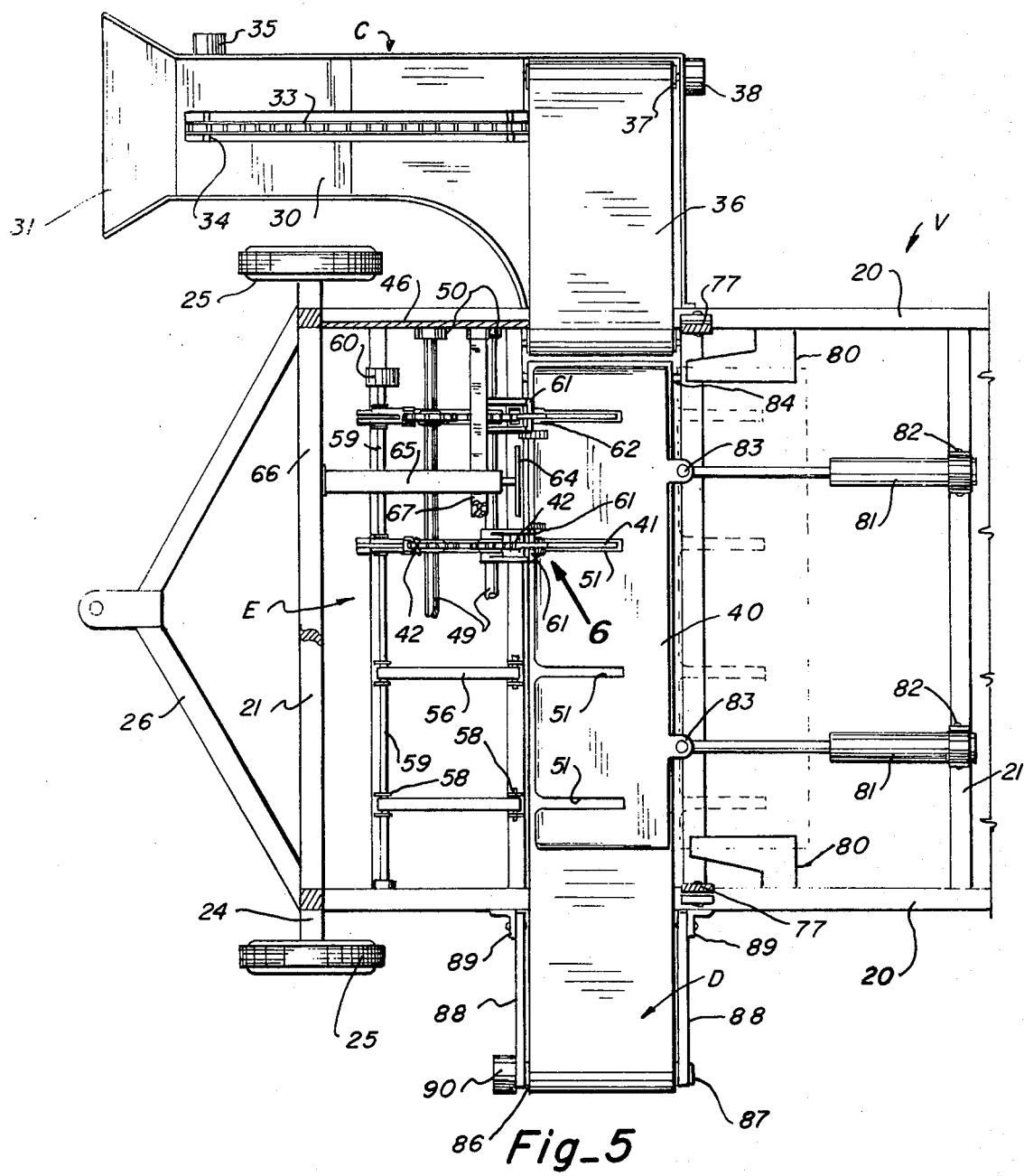
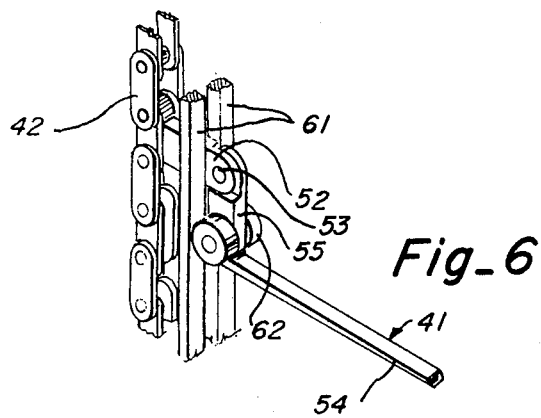

BALE HANDLING APPARATUS

The present invention is a continuation-in-part of my pending application for a Bale Handling Apparatus, Ser. No. 335,547, filed Feb. 26, 1973, and has now issued as U.S. Pat. No. 3,817,405 on June 19, 1974. to disclose and claim subject matter related to the subject matter in my pending application. This invention relates to vehicle-mounted apparatus for handling hay bales, and more particularly to a hay bale loading and unloading apparatus which receives and discharges hay bales, one at a time. As such, the invention will be called "A Bale Handling Apparatus."

In those portions of the United States where there is high humidity and considerable rainfall, as in regions commonly called the northeast, middle east and in the eastern portion of the midwest, the farmers must protect their hay crop from the weather and the common practice is to bale the hay and store the bales in a barn or similar structure. The bales are then taken from the barn as they are needed. In such operations, a substantial labor cost is incurred in loading the hay bales onto a vehicle in the field and thereafter, unloading the bales as onto a conveyor system in the barn. A subsequent, also costly, operation is in loading the hay bales stored in the barn onto a vehicle, transporting the same to a feed lot and then unloading and distributing the bales sequentially, one-by-one, at selected locations about the feed lot.

While machinery has been developed for picking up bales in a field and forming bale stacks, such is not always suitable where conveying and stacking apparatus is provided for in barns, which usually have receiving and dispensing conveyors for handling one bale at a time. The available bale pickup and handling equipment is for handling bale stacks in different types of operations from that above described. A bale throwing apparatus is available to speed up the loading of a vehicle in a field, but this does not avoid hand labor in unloading the vehicle at the barn. The invention disclosed in the pending application, above mentioned, was conceived and developed to provide an apparatus which will more effectively handle bales where it is desirable to pick up and to discharge bales one at a time.

The present invention is an improvement over the construction disclosed and claimed in that pending application as will hereinafter appear. As such, the present invention includes a vehicle having a deck whereon a bale stack may be held and a bale loading and unloading apparatus at one end of the vehicle which may be a trailer or a self-propelled, motorized unit. The deck holds a longitudinal, horizontally disposed stack of hay bales arranged as an array of transverse, vertical tiers of bales. The loading and unloading apparatus, including an elevator, is adapted to receive the bales to first form transverse layers which, in turn, form a tier to add to the stack or, in reverse, to receive a tier and dispense the layers of bales therefrom, one bale at a time.

It follows that an object of the present invention is to provide, in combination with a vehicle having a deck for receiving and holding a stack of hay bales, a novel and improved apparatus for receiving bales to add to the stack and for dispensing bales from the stack.

Another object of the invention is to provide, in combination with a vehicle which will hold a horizontally disposed stack of hay bales and which includes a receiving and dispensing apparatus at one end of the vehicle, a movable, tippable deck to more effectively shift the stack of bales away from, or towards, the receiving and dispensing apparatus as the apparatus adds a tier of bales to the stack or takes a tier of bales away from the stack, and also, tips the stack towards and away from the receiving and dispensing apparatus to better hold the end tier of the stack in place.

Another object of the invention is to provide a novel and improved hay bale receiving and dispensing apparatus mounted upon a vehicle having a deck to receive a horizontal stack of vertical bale tiers wherein the receiving and dispensing apparatus includes an elevator which will receive bales, one at a time, as transverse bale layers, to then lift the layers to form a vertical tier to be added to the stack, or receive a tier of bales from the stack to be lowered a layer at a time and then dispensed one at a time from the tier.

Other objects of the invention are to provide in a novel and improved bale handling apparatus which performs the desired functions above indicated, an arrangement of components which is simple, versatile, economical, effective, rugged and durable. With the foregoing and other objects in view, as will hereinafter appear, my invention comprises certain constructions, combinations and arrangements of parts and elements as hereinafter described, defined in the appended claims and illustrated in the accompanying drawing, in which:

FIG. 1 is a right hand side elevation view of a first embodiment of a bale loading apparatus constructed according to the principles of the invention;

FIG. 2 is a plan view of the bale loading apparatus shown at FIG. 1;

FIG. 3 is a fragmentary longitudinal sectional view of the apparatus as taken from the indicated line 3—3 at FIG. 2, but on an enlarged scale;

FIG. 4 is a portion of the showing at FIG. 3, but on a further enlarged scale and with broken lines indicating alternate positions of components shown therein;

FIG. 5 is a fragmentary sectional plan view as taken from the indicated line 5—5 at FIG. 3, but on an enlarged scale and with portions of components broken away to show parts otherwise hidden from view;

FIG. 6 is a fragmentary isometric view of a portion of the lifting elements as from the indicated arrow 6 at FIG. 5, but on an enlarged scale;

Figure 7:
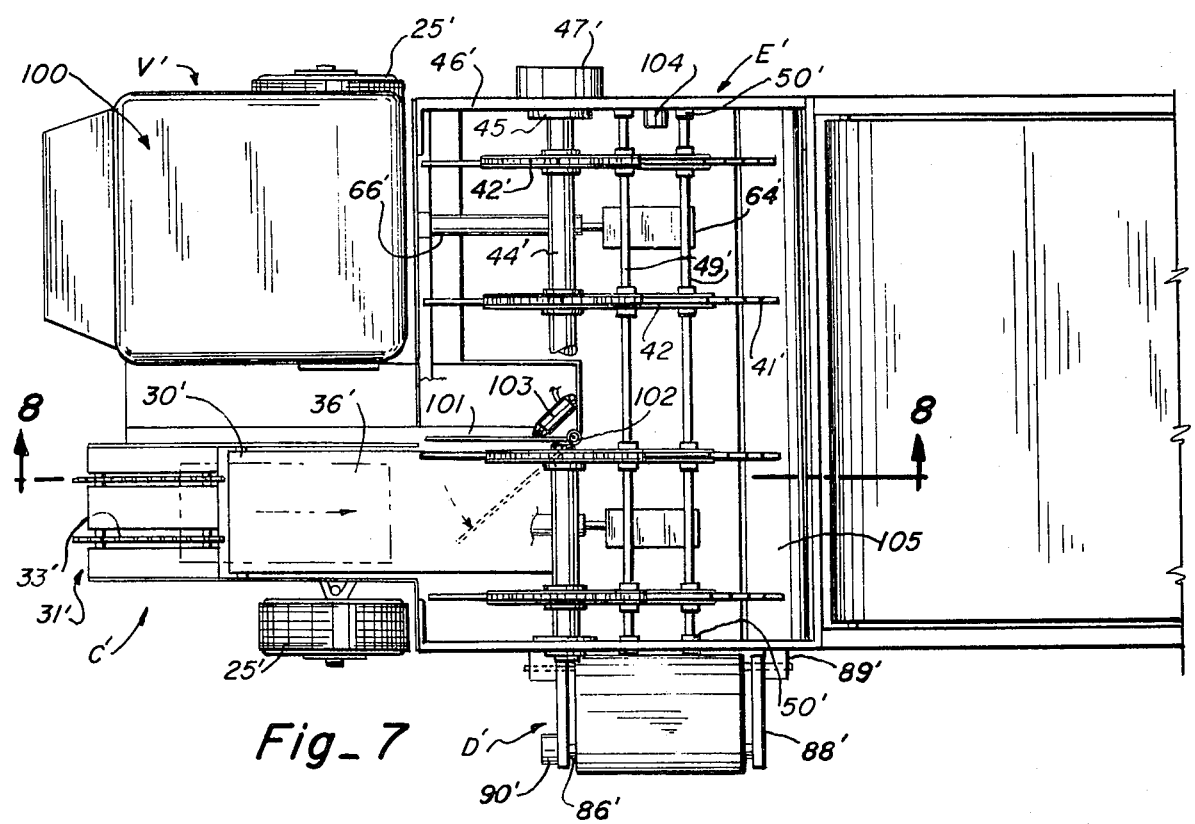
FIG. 7 is a plan view similar to FIG. 2, but illustrating a second, self-propelled embodiment of the bale loading apparatus.

Referring first to the embodiment disclosed in FIGS. 1 through 6 of the drawing, the bale handling apparatus is carried upon a vehicle V which is a wheel mounted trailer formed in a conventional manner. As such, the vehicle frame includes a pair of longitudinal frame sills 20 which are spaced apart by suitable crossbeams 21. A transverse rear axle 22 is affixed to the rear of the sills and two rear wheels 23 are mounted upon this axle. A transverse crossplate 24 is affixed to the sills 20 and connects with a steering axle by a suitable pin, not shown, and front wheels 25 are mounted upon this axle. A steering tongue 26 connects with the axle for connection with a suitable tractor, not shown. The vehicle may be designed for towing as shown, or it may also be self-propelled as hereinafter described.

The bale handling apparatus mounted upon this vehicle includes a bale pickup conveyor C at the side of the vehicle to pick up bales as they lie in the field or to receive them as they are discharged from a baler. The bales are then rotated and shifted from the conveyor to a base at the rearward side of a stacking elevator E where they are arranged in pairs, end to end, to form a transverse bale layer. As a bale layer is formed, it is raised in the elevator and other bales are moved in position to form other bale layers which are likewise lifted by the elevator until a group of these layers form a vertical tier. The tier is then shifted rearwardly upon a stack deck S, rearwardly of the elevator E. Subsequently, the operation will be reversed and a tier will be pushed forwardly, off the stack deck and onto the elevator. The elevator is then lowered to permit each layer, a pair of bales, to be placed on a discharge belt D which will remove the bales from the apparatus, one at a time.

To carry the several components of the bale handling apparatus, each is secured and supported upon suitable framework members which extend to a frame sill 20 or crossbeam 21. These framework members will include uprights, longitudinal members and cross members and also, side walls to hold the bale stacks in position, as hereinafter further described.

The bale pickup conveyor C is mounted near the front, and to one side of the vehicle to pick up bales as the vehicle moves alongside them and to then deposit the bales at the elevator E and between the elevator and the stack deck S at the rear of the apparatus. This bale pickup conveyor C is eesentially a conventional unit and thus need not be described in detail. It is formed generally as a rectangular chute 30 inclined upwardly at a steep angle with an entrance 31 at the ground level and a side discharge 32, into the elevator, immediately over the sills 20. This chute thus turns a bale from a longitudinal position at its entrance 31 to a transverse position at its discharge 32. This conveyor C includes a conventional bale gripping conveyor chain 33 at its longitudinal entrance section and this conveyor chain is extended about the sprockets carried upon shafts 34 below the floor of the chute as indicated at FIGS. 2 and 5. It is driven by a suitable hydraulic motor 35 secured to one of the shafts at the side of the conveyor. A short, transverse turning belt 36 is located at the transverse discharge section of the conveyor which cooperates with the conveyor chain 33 to turn bales as they move to the discharge position adjacent to the elevator. This turning belt 36 is mounted upon shafts 37 and is driven by a suitable hydraulic motor 38 as also shown at FIGS. 2 and 5.

As the bales are discharged from the conveyor C, they move into a loading section at the base of the elevator E and this loading section, formed as a flat, smooth, transverse holding plate 40, is proportioned to receive two bales at a time in a transverse, end-to-end alignment. The two bales are pushed into place upon this holding plate 40 by the turning belt 36 and, if necessary, a pusher device, not shown, can be used to supplement the movement of this turning belt to properly place the two bales upon the plate 40.

The elevator itself includes arrays of tines 41 which pick up the bales and move them upwardly from the holding plate 40. Four sets of tines are necessary to handle two end-abutted bales and accordingly, the bale elevator includes four vertical chain loops 42 mounted in front of the holding plate and upon upper and lower sprockets, with each loop 42 having its array of tines 41 uniformly spaced about its circumference. The chains extend about top sprockets 43 which are mounted and fixed upon a common transverse shaft 44 which, in turn, is carried in bearings 45 affixed to sidewalls 46 of the apparatus framework. This top sprocket shaft includes a drive 47 which will drive the chains in unison in an intermittent manner through selected distances corresponding to the spacing of the tines upon the chains. Such drives are conventional and the drive disclosed in my pending application, heretofore noted, may be used in this improved arrangement. Hence, the details of the drive need not be further described.

A pair of smaller sprockets 48 is used at the lower end of each chain loop 42 to provide a flat, horizontal, bottom reach of the chain loop to control the path through which the tines move. These lower sprockets 48 are mounted upon transverse shafts 49 which extend to bearings 50 in the side walls 46 of the apparatus framework.

The tines 41 must move underneath the bales to pick them up and to facilitate this movement underneath the bales, a slot 51 is provided in the holding plate 40 at each tine 41 location so that the tine may move into the slot and thus not disturb the position of the bale upon the plate. To accomplish such a movement, each tine 41 must be articulated. Thus, each tine 41 is connected to the outstanding end of a base arm 52 fixedly outstanding from a link of the chain 42 and the tine is held by a pivot 53. The tine 41 is shaped as an angled member having its blade portion 54 outstanding, at a right angle, from a shorter link 55 which, in turn, pivots to the base arm 52. The tines thus swing from their base arms to position the blades 54 horizontally when they are moving horizontally on the horizontal underreach of the chain. Thus, they may move under the bales and to do this, they swing from the base arms to position the fork blades 54 horizontally.

When the tines swing under the bottom reach of the chain to move horizontally, the blades 54 are shifted to a horizontal position by moving guide belts 56 underneath the chains as best illustrated at FIG. 4. These guide belts 56 are mounted upon rollers 57 which, in turn, are mounted in bearings 58 with a shaft 59 extending through the rollers at the forward ends of the belts to connect with a common drive motor 60.

When the tine blades 51 are under the bales and commence to move upwardly, the angled portions of the tines are restrained, to cantilever the blades 54, by vertical rails 61 alongside each chain. Restraining rollers 62 on each link 55 engage the rails 61 as best illustrated at FIG. 6. Two rails for each chain are illustrated in that view, but a single rail would suffice. The rails may be mounted in any suitable manner. For example, they may be anchored to the sprocket shaft 44 by support bearings 63 as illustrated at FIGS. 3. and 4.

In operation, a set of tines first moves horizontally and into the slots 51 of the holding plate 40 to pick up a pair of bales. Thereafter, as the chains carrying tines 41 move about the lower, rearward sprockets 48 and thence upwardly, the tines then move bales upwardly to make room for a next pair of incoming bales. At the same time, other bales which may be thereabove, and are also held by tines, will be shifted higher. The sequence of operation is continued in an intermittent manner until a complete vertical tier of bales is formed and the tier is ready to be shifted from the tines and onto the stacking deck S. In the drawings, the elevator is illustrated as being vertical and the tier of bales held by the tines will also be vertical. It is to be noted, however, that this elevator E may be tipped forwardly at its top at a small angle to better secure the tier of bales in place upon it, but such tipping does not effect the basic operation of the apparatus.

The operation of shifting a bale tier from the elevator to the stack is accomplished by pusher plates 64, there being an upright pusher plate 64 for each group of bales at each side of the tier. Each pusher plate 64 is set between a pair of the chain loops 42 at a side of the tier to engage the center portion of the group of bales at that side. Each pusher plate is mounted upon the pistons of upper and lower hydraulic cylinders 65. All of these cylinders 65 operate in unison to extend their pistons and shift a tier of bales to the stacking deck D to become part of the bale stack. The cylinders 65 are secured to a beam 66 at the front wall of the elevator structure and the rearwardly extended ends are supported upon suitable crossbeams 67. The cylinders 65 are interconnected with hydraulic lines in any conventional arrangement to force the cylinders to act in unison so that a tier of bales will be shifted from the tines 41 to the deck in a smooth, easy manner and without disruptions.

The stacking deck S is essentially the same as that described in my prior, pending application and thus a detailed description is unnecessary. This stacking deck S includes a movable floor 70 mounted between rollers 71 which are, in turn, carried upon a longitudinally extended frame 72. Intermittently operated motors 73 drive the rollers at each end of the deck and are used to move the floor back and forth in stages corresponding to the width of a bale tier. The movable floor 70 also carries an abutment wall 74 which supports the rearward bale tier of the stack. Sidewall structures 75 upstanding from the frame 72 protect the side of the bale stack. Also, a releasable restraining arm 76 is at the top front corner of each sidewall 75 to hold the top of the front bale tier to prevent the bale tier from falling forwardly and into the elevator unless it is moved therein by a positive action.

It follows that the stacking deck S intermittently moves rearwardly as tiers of bales are pushed onto the movable floor 70 until a stack is completed. The vehicle V will then be towed to any suitable location where bales are to be discharged. A reverse movement of the floor 20, in an intermittent manner and accompanied by the release of the restraining arms 76, will push tiers of bales from the deck and onto the tines 41 of the elevator E. The tines are then lowered, step by step, to drop bales from a tier, one layer at a time, upon a discharge chute D which will be further described.

This stacking deck S is disposed above the frame members 20 of the vehicle and a tier of bales will necessarily be raised to a position where the undersurface of the lower layer of bales of the tier will be at the level of the floor 70. The stacking deck S may be arranged to tip forwardly and rearwardly. The front end of the frame structure 72 of the deck is supported upon vehicle frame sills 20 by upraised hinges 77 while the rear end of the frame 72 is supported upon a cylinder 78 which is secured to the vehicle frame 20. This cylinder extends its piston upwardly to hold the frame 72. Whenever the piston of cylinder 78 is retracted from a normal position, the stacking deck S is tipped rearwardly, as illustrated at FIG. 3, and this is a desirable position for holding the horizontally disposed stack, as when the vehicle is moving, to minimize the chance for bales falling forwardly. Whenever the piston is extended, the stacking deck S will tip forwardly and this is a desirable position for shifting a tier of bales from the stacking deck to the elevator E whenever bales are being discharged from the machine.

The discharge belt D, which discharges bales from the apparatus, is positioned underneath the holding plate 40 to extend transversely through the apparatus and from the side of the vehicle opposite to bale pickup conveyor C. Accordingly, the holding plate 40 must be moved out of the way when the discharge belt is being used. To retract the holding plate 40, it is mounted upon slides 80 which are carried upon frame members 20 at each side of the apparatus and extend rearwardly underneath the movable floor of the stacking deck S, as best illustrated at FIG. 3. A pair of longitudinally extended cylinders 81 is mounted upon abutments 82 secured to a suitable framework cross member 21 rearwardly of the slides 80. The pistons of these cylinders connect with ears 83 at the rearward edge of the holding plate 40. These pistons are extended whenever the holding plate is over the discharge belt and are retracted into their cylinders to pull the plate out of the way of the discharge belt B. Suitable hydraulic lines, not shown, connect with the pistons so they will act in unison to move the holding plate 40 from over the discharge belt D or extend it over the discharge belt D, all in a smooth, easy manner.

The inner end of discharge belt D, within the framework of the vehicle V, is carried by a roller 84 having its shaft supported in bearings 85 which in turn are secured in suitable framework cross members 21 at each side of the belt as best illustrated at FIG. 4. The other end of the belt extends over the frame sill 20 at the left side of the vehicle and a short distance therebeyond to facilitate dropping the bales upon another conveyor or upon a deck which may be positioned several feet from the vehicle. The extended end of the discharge belt D is carried upon a roller 86 whose shaft is supported by bearings 86 mounted between laterally extended arms 88 as shown at FIGS. 2 and 5. The arms 88 are carried upon pivotal lugs 89 secured to the frame sill 20 so that they may be swung upwardly and out of the way when the discharge belt is not in use. This discharge belt is operated by a suitable hydraulic motor 90 connecting with the roller 86.

It is contemplated that the several motors and pistons of this apparatus which drive the various components, can be operated manually or automatically as desired. Power to operate the apparatus may be from a suitable hydraulic pump to pump fluid under pressure to the cylinders and to the hydraulic motors. The controls for this system will be valves. The hydraulic powered system may be supplemented by an electrical system to operate the control valves. Such a system is shown in my prior application and any skilled artisan can modify that system to operate the several components disclosed in the present apparatus. In the operation of the present apparatus, the bale pickup conveyor may have its conveyor chain 33 and the belt 36 running continuously to pick up, rotate and discharge bales into the bale stacking elevator with a limit switch in the bale stacking elevator, not shown, to stop the conveyor chain 33 and belt 36 only when the bale stacking elevator cannot receive additional bales. As a pair of bales is deposited on the holding plate, another limit switch may trigger the drive 47 to lift the pair of bales to a position above the holding plate to commence forming a tier and to free the holding plate for receiving additional bales. The drive 47, being of an intermittent nature, will repeat the lifting operation each time a pair of bales moves onto the holding plate 40 and when a bale tier is completed, a suitable limit switch, not shown, will signal the pusher plates 64 to push the tier from the elevator E and onto the stacking deck S. At the same time, the cylinder 78 will extend its piston sufficiently to tip the stacking deck to a proper position for receiving the bale tier. Thereafter, the sequence is repeated until the stacking deck is loaded with bale tiers and is ready for discharge.

Figure 8:
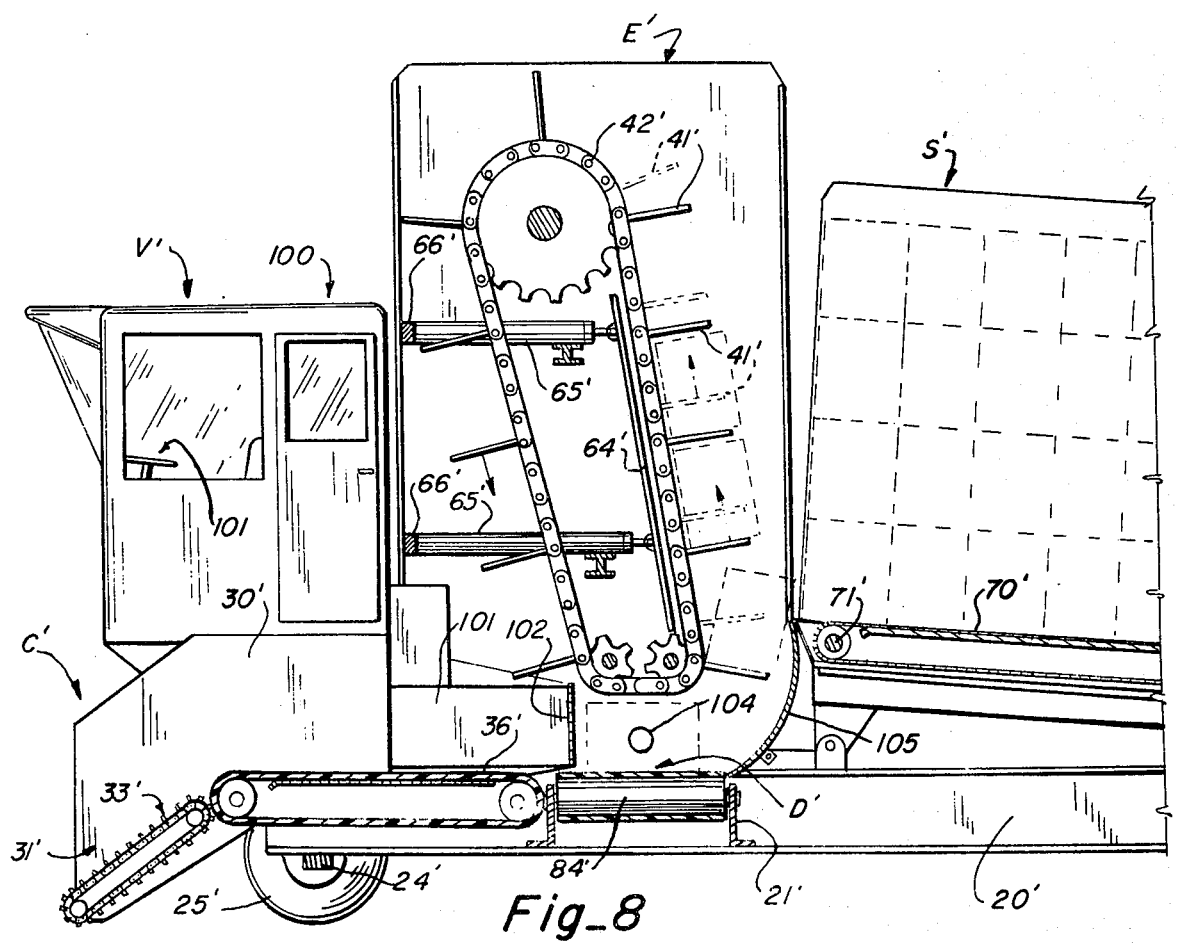
FIG. 8 is a fragmentary, longitudinal, sectional view as taken from the indicated line 8—8 at FIG. 7.

The alternate embodiment of the invention, shown at FIGS. 7 and 8, discloses a modified elevator E' which is mounted upon a self-propelled vehicle V' with a bale pickup conveyor C' having the entrance 31' of its chute 30' directly in front of the vehicle rather than to the side of the vehicle. The vehicle V' will include a frame formed of longitudinal sills 20' and cross members 21', in an arrangement suitable for supporting the several components hereinafter described. The vehicle will be mounted upon a rear axle supporting rear wheels, not shown, and a front axle 24' supporting steerable front wheels 25'. An operator's cab 100 including a motor, not shown, is conveniently located at one side of the front end of this vehicle, as illustrated, to provide space for placing the conveyor C' at the other side of the front end of the vehicle. The cab 100 includes steering and driving controls which are operatively connected to the front steerable wheels 25' and the power transfer mechanisms from the motor may be connected to the rear and/or front wheels of the vehicle V' to drive it. These components are conventional and need not be described in further detail.

The bale pickup conveyor C', mounted upon one side of the front of the vehicle, is adapted to pick up a bale lying longitudinally with respect to the longitudinal axis of the vehicle and thus, when the bale moves from the pickup conveyor C' and into the elevator E', it must be rotated 90° to a transverse position with respect to the vehicle. The bale chute 30' is thus a straight, channel-like structure having its entrance 31' at the front of the vehicle and its discharge 32' directly behind the entrance at the elevator E'. A conveyor chain 33' lifts the bale up to a desired elevation above the basic vehicle framework and thence, a longitudinal belt 36' moves the bale rearwardly. The holding plate 40 heretofore described is eliminated and the transversely disposed discharge belt D', essentially the same as heretofore described, serves a double function not only of discharging bales, but also of holding the bales in place in the elevator before they are picked up by the elevator tines. Accordingly, as a bale moves rearwardly upon the belt 36' and onto the transverse discharge belt D', the discharge belt is moved laterally to commence rotating the bale. To supplement this rotation, an inner wall portion of the chute 36' is formed as a gate 101 which is mounted upon a pivot 102 to be operated by a cylinder 103 to swing behind a bale and facilitate rotating the bale to its proper position upon the discharge belt D'.

To place a pair of bales upon the discharge belt D' in a transverse, end-to-end arrangement so that they may be picked up by the elevator E', the discharge belt D' will shift the first of a pair of bales received from the conveyor C' at the left hand side of the vehicle to the right hand side of the vehicle, where the bale will be held by a stop 104. The second of the pair of bales then moves into position upon the discharge belt D', relying upon the gate 101, as well as the belt movement, to swing it from a longitudinal to a transverse position.

The bale pickup elevator is formed as four arrays of tines 41' mounted upon chain loops 42' which are carried upon top sprockets 43' and bottom sprockets 48', as heretofore described. The top sprockets are mounted upon a shaft 44' held in side wall bearings 45' and this shaft 44' is driven intermittently, as by a drive 47' to move the tines 41' from one position to the next, the same as heretofore described. The lower end of each chain loop 42' is mounted upon smaller spaced-apart sprockets 48' which are, in turn, mounted upon shafts 49' extending to side wall bearings 50', as heretofore described.

In contrast with the operation heretofore described in connection with FIGS. 1–6, the bale handling operation in this modified arrangement is changed to permit the pickup of bales by tines 41' which rigidly outstand from the chain 42' at selected regular spaces corresponding with the sizes of the bales. The sprockets 48' are positioned directly over the discharge belt D' and thus the pair of bales upon this discharge belt D' will be directly underneath the horizontal reach of the chain sections between the lower sprockets 48' and a rigid outstanding tine 41' will engage the side of a bale to push the bale rearwardly as the tine 41' moves rearwardly underneath the horizontal reach of the chain between the sprockets 48'. As the bales are pushed rearwardly, they will strike a transverse, arcuate turnplate 105 at the rearward side of the discharge belt D'. This turnplate moves the bales upwardly to the edge of the movable floor 70' of the stack deck S and, at the same time, turns the bales so that they continue to lie upon the tines 42, as illustrated in broken lines at FIG. 8.

To complete the elevator, pusher plates 64' carried upon cylinders 65' are attached to suitable beams 66' at the front wall of the elevator structure and cross beams 67' rearwardly therefrom. These pushers 64' will function to push a tier of bales from the elevator and onto the stacking deck S' in the same manner as heretofore described. It is to be noted that the chain loop 42' is illustrated as being tipped to better hold a tier of bales in place and prevent them from falling from the tines. Accordingly, the pusher plates 64' are also shown as being correspondingly tipped. This requires different degrees of movement between the upper and lower cylinders 65'; however, an artisan can easily provide for a suitable arrangement of cylinders 65' to accomplish the proper cylinder movements to shift a tier of hay bales from the elevator itself and onto the stacking deck S'.

The bale stack deck S' is essentially the same as that heretofore described and may be held either horizontally tipped rearwardly to better hold the stacks on the deck or tipped forwardly to better shift a tier of bales from the deck and onto the elevator when unloading operations are occurring. Likewise, the discharge belt D' is essentially the same as that heretofore described and will extend outwardly from the left hand side of the vehicle by arms 88' mounted on lugs 89' to discharge bales a short distance from the side of the vehicle. The discharge belt is operated by a motor 90' which may be conveniently connected to a shaft of a roller 86' at the end of the belt.

The overall sequence of operation of this modified embodiment is essentially the same as heretofore described. Bales are moved from the conveyor to a bale receiving station at the bottom of the elevator E' which is, in the modified embodiment, the surface of the discharge belt D'. The bale layer holding sections formed by the tines then operate to lift bales from the receiving station to form a tier which is subsequently pushed onto the stack deck S'. When a stack of bales is formed upon the deck, the discharge process is essentially the reverse. The bales are moved from the stack deck S' onto the elevator E' a tier at a time and the layers of the tier are lowered one by one onto the discharge belt D' to be discharged from the apparatus. As heretofore described, the controls for operating this apparatus may be manual or automatic.

I have now described my invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

I claim:

1. Apparatus to load hay bales upon the deck of a vehicle to form a longitudinally extended, horizontally disposed stack which consists of a longitudinal array of transversely disposed, vertical bale tiers, with each tier consisting of a vertical array of transversely disposed bale layers, the loading apparatus, in combination with the vehicle and a bale pick-up means at one side of the vehicle, being located at one end of the vehicle and comprising:
   a. a bale-shifting means at the base of the apparatus including a transverse plate means across the vehicle to receive bales from the bale pick-up means and shift the same to form a transversely disposed bale layer upon the plate means;
   b. an upright bale elevator above the plate means having a plurality of bale-height spaced, transverse, horizontally-extended, vertically-shiftable, bale-layer-holding groups of tines which will extend, vertically, at least to the height of a bale tier of the stack with the several groups of tines being shifted to be positioned with respect to the vehicle deck so that bale layers carried upon the groups of tines will form a tier at the vehicle deck level;
   c. a stepper means adapted to move each group of tines from the bottom of the bale elevator first horizontally and longitudinally from one side of the transverse bale holding plate means and underneath a bale layer upon said plate means and then upwardly a distance sufficient to permit another bale layer to be formed on the plate means and thereafter upwardly in a stepped sequence as other groups of tines move across the bale holding plate means; and
   d. a pusher means associated with the bale elevator to push a completed bale tier from the elevator and onto the deck when a bale tier is formed by repeated cycles of forming bale layers on the plate means and moving the layers upwardly on the elevator by repeated operation on the stepper means.

2. In the apparatus defined in claim 1, wherein: chain loops are extended between upper and lower sprockets at one side of the groups of tines to hold the tines, with the lower sprockets being slightly above the plate means, with individual tines being affixed to the chains to outstand horizontally therefrom in the upright reaches of the chain between the upper and lower sprocket; and
means to articulate the angle of the tines of each group with respect to the chain as the chain passes underneath the lower sprockets to shift the tines of the group to a horizontal position and thence move underneath the bale layer upon the plate means.

3. In the apparatus defined in claim 2, including: sockets in the plate means wherein the tines move when they move under the bale layer and upon the plate means.

4. In the apparatus defined in claim 2, including: guide means to place the bales upon the tines during the horizontal and vertical movements of the tines and immediately above the bale-holding plate means.

5. In the apparatus defined in claim 2, wherein: pairs of spaced sprockets are located at the lower ends of the chains to form a horizontal reach of chains where the tines will move in an extended horizontal path at the bottom of the elevator to move under the bales before moving vertically up the elevator.

6. In the apparatus defined in claim 2, wherein: said tines are angled to provide a link portion and a blade portion perpendicular to the link portion, with said link portion being pivotally held on the chains, whereby the same may hang from the chains when the tines are at the bottom horizontal reaches of the chains, with the blade portions being substantially horizontal to move under the bales at the bottom of the elevator; and
means to continue to hold the blades horizontally as they move upwardly on the vertical reach of the chains.

7. In the apparatus defined in claim 6, wherein: the means for holding the blades horizontally includes quide rails engaging a portion of the tines.

8. In the apparatus defined in claim 1, wherein: chain loops are extended between upper and lower sprockets;
said tine groups rigidly outstand from the chains;
said bale receiving section is underneath the lower sprockets, whereby the sides of the bales are contacted to move horizontally by tines which are at the chain portions under the lower sprockets; and
guide means at the side of the bale receiving station hold the bales against the tines and rotate the bales as the tines swing from a vertical position underneath the lower sprockets to a horizontal position at the vertical bale holding reach of the chains.

9. In the apparatus defined in claim 8, wherein: the guide means includes an arcuate plate whereon the bales will slide in a rotative upward movement.

10. In the apparatus defined in claim 1, the deck of the vehicle is tippable to tip into the elevator when receiving or discharging a bale tier therefrom or thereto, and away from the elevator when the vehicle is moving, and including:
a hinge means at one end of the deck and a vertically extendable means at the other end of the deck.

* * * * *